No. 853,609. PATENTED MAY 14, 1907.
W. VARTMANN.
SAW.
APPLICATION FILED MAR. 27, 1907.

Witnesses,
George Voelker
Hattie Smith

Inventor,
Walter Vartmann
by Lothrop & Johnson
his Attorneys.

THE NORRIS PETERS CO., WASHINGTON, D. C.

UNITED STATES PATENT OFFICE.

WALTER VARTMANN, OF ST. PAUL, MINNESOTA.

SAW.

No. 853,609.  Specification of Letters Patent.  Patented May 14, 1907

Application filed March 27, 1907. Serial No. 364,801.

*To all whom it may concern:*

Be it known that I, WALTER VARTMANN, a subject of the Emperor of Germany, residing at St. Paul, in the county of Ramsey and State of Minnesota, have invented certain new and useful Improvements in Saws, of which the following is a specification.

My invention relates to improvements in saws, particularly those designed for cabinet work, its objects being to provide a saw which is especially adapted for corner work, where it is desirable that the saw should lie flat against one of the walls or faces of the structure to be worked and yet not mar it; and also to provide a saw which may be used for both right handed and left handed work.

To that end the invention consists in the construction, combination and arrangement of parts hereinafter described and claimed.

Figure 1:
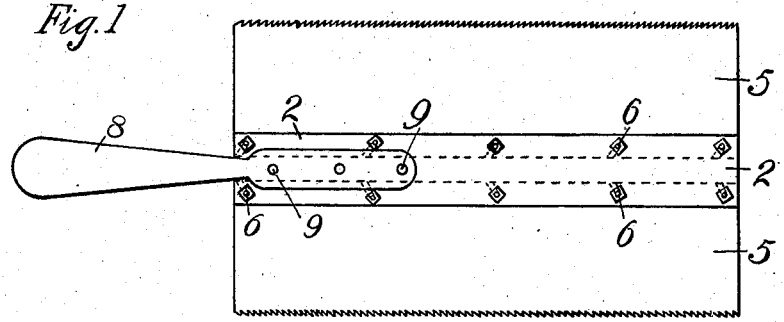
Figure 2:
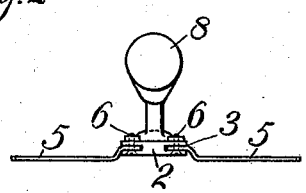
Figure 3:
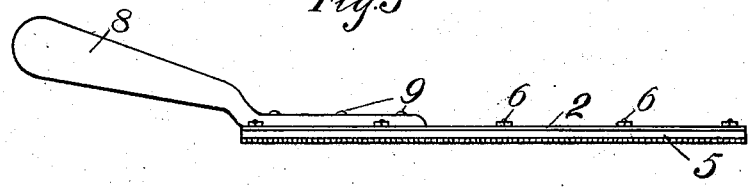

In the accompanying drawings forming part of this specification, Figure 1 is a plan view of the improved saw; Fig. 2 is an end view; Fig. 3 is a side edge view, and Fig. 4 is a perspective view of the outer end of the saw, which is shown partly broken away.

As shown in the drawings, the saw comprises a flat longitudinal rib, 2 formed in each side edge with a slot 3 extending, preferably, its entire length and adapted to receive the side edge 4 of a saw blade 5. The blade is detachably secured in the slot by means of clamps or bolts 6 passing through the rib and through open-ended transverse slots 7 in the edge of the blade, the rib portions above and below the slot being sprung in against the blade. It will be seen that the blades on either side of the rib are quite independent of each other, and independently secured to the rib, so that the saw may be used with either blade alone or with both blades according to the needs of the work in hand, and a blade may be used on one side adapted for a different kind of work from the blade on the other side.

Figure 4:
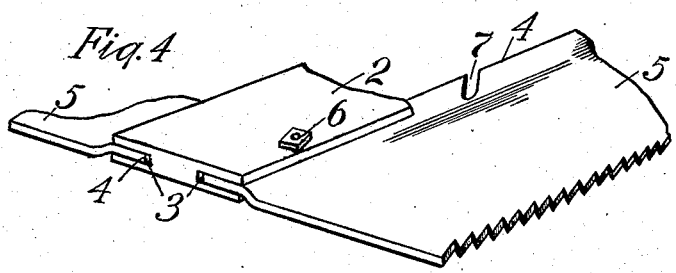

In order that the saw may lie flat upon the wall or face of the structure in hand, and may be worked back and forth over it without scratching or marring it, the back blade-edge 4 which is inserted into the slot is bent up or offset, as shown in Figs. 2 and 4, so that the plane of the blades will lie slightly below the place of the under side of the rib, and the rib with its bolt holes and bolts will not touch the surface over which the saw is worked. The saw is provided with an upwardly offset stick-like handle 8, such as is commonly used upon trowels, secured to the rib by any suitable means, such as the rivets 9. With a saw constructed in this way a cut can be made very exactly along the plane of the surface over which the saw is worked and with the greatest ease and convenience of operation.

I claim as my invention:

1. A saw of the class described comprising a longitudinal rib, a pair of saw blades independently and detachably secured to the rib, one on each side thereof, and an upwardly offset handle carried by the rib.

2. A saw of the class described comprising a longitudinal rib, a pair of saw blades independently and detachably secured to the rib, one on each side thereof, the secured edge of each saw blade being upwardly offset whereby the bottom of the rib will lie above the plane of the saw blades, and a handle carried by the rib.

3. A saw of the class described comprising a longitudinal rib having in each side a lengthwise slot, a pair of saw blades having upwardly offset back edges detachably secured within the slots, and an upwardly offset handle carried by the rib.

4. A saw of the class described comprising a rib, a pair of saw blades detachably secured to the rib, one on each side thereof, and an upwardly offset trowel-like handle carried by the rib.

In testimony whereof I affix my signature in presence of two witnesses.

WALTER VARTMANN.

Witnesses:
ARTHUR P. LOTHROP,
HATTIE SMITH.